United States Patent [19]
Wright

[11] Patent Number: 5,398,463
[45] Date of Patent: Mar. 21, 1995

[54] MULTIPLE-UNIT MOBILE DISPLAY PAVILION

[76] Inventor: Jack R. Wright, Box DD, Kimberly, Id. 83341

[21] Appl. No.: 117,768

[22] Filed: Sep. 7, 1993

Related U.S. Application Data

[63] Continuation-in-part of Ser. No. 81,010, Jun. 21, 1993.

[51] Int. Cl.⁶ .......................... E04H 1/12; B60P 3/025
[52] U.S. Cl. .............................................. 52/7; 52/64; 52/69; 52/79.1
[58] Field of Search ........................ 52/7, 79.1, 69, 64

[56] References Cited

U.S. PATENT DOCUMENTS

| | | | |
|---|---|---|---|
| 3,181,203 | 5/1965 | Wenger | 52/7 |
| 3,217,366 | 11/1965 | Wenger | 52/7 |
| 3,258,884 | 7/1966 | Wenger | 52/7 |
| 3,620,564 | 11/1971 | Wenger | 52/69 |
| 4,412,403 | 11/1983 | Le Franc et al. | 52/64 |
| 4,413,855 | 11/1983 | Flanagan | 52/79.6 |
| 4,603,518 | 8/1986 | Fennes | 52/64 |
| 4,720,945 | 1/1988 | Berranger et al. | |
| 5,078,442 | 1/1992 | Rau et al. | 52/7 |

FOREIGN PATENT DOCUMENTS 2100316 12/1982 United Kingdom .................... 52/7

*Primary Examiner*—Carl D. Friedman
*Assistant Examiner*—Wynn E. Wood
*Attorney, Agent, or Firm*—Ken J. Pedersen; Barbara S. Pedersen

[57] ABSTRACT

Various embodiments of a multiple-unit mobile display pavilion are shown and described. Each embodiment includes a trailer for being attached to a wheeled chassis and a vehicle, solid portions on a first side wall and second side wall that are offset from each other, doors on the first side wall and second side wall that are offset from each other and that each swing down to a slanted position against the ground, a support system on the inner surface of each of the doors for receiving and displaying merchandise, and latches for securing each of the doors when it is closed. The support system on each door is preferably a series of steps that transforms each door into a terraced platform. The two-sided and offset arrangement of the doors and solid portions allows walk-around shopping on two sides of the pavilion and allows two or more businesses to conveniently operate in the pavilion, while also keeping the trailer architecturally strong. An optional separation wall may separate the trailer interior space into two or more separate areas of business. An optional removable stage member may be attached to the steps of a door to provide a horizontal extension out from the trailer for use as a stage or flat display area. The pavilion is preferably self-contained in terms of utilities and water and may be set up and folded away with a minimum of steps.

16 Claims, 7 Drawing Sheets

MULTIPLE-UNIT MOBILE DISPLAY PAVILION

This application is a continuation-in-part of my prior co-pending application, Ser. No. 08/081,010, filed Jun. 21, 1993, and entitled "Mobile Display Pavilion", the disclosure of which is hereby incorporated by reference.

BACKGROUND OF THE INVENTION

1. Technical Field

This invention relates generally to merchandise sales stands, and, more particularly, to stands that are compact and mobile for transport and that open up for merchandise display.

2. Background Art

Garden center, plant nursery, and produce retail is an area of business that could greatly benefit from a mobile display stand. Especially in cooler climates, the traditional garden center or fresh produce shop may have difficulty in making enough profit during the growing and gardening season to cover year-around expenses such as building maintenance, real estate mortgages, real estate taxes, advertising, and wages. In addition, it is especially difficult to support a stationary garden center in many rural areas, where the lack of population makes the growing season sales less lucrative. Such problems have limited the number of garden centers built in northern climates and in smaller towns. The garden center businessman with a mobile stand could overcome these problems by moving his business according to the seasons and weather and taking merchandise to any location having many prospective customers. Many other businesses could also greatly benefit from a mobile display stand. For example, a saddle and tack business could follow the workers and performers in a rodeo circuit. A recreational clothing business could travel to parks and resorts, or a craft business could follow the craft fair circuit.

Some designs for mobile stands are available, but each has one or more drawbacks. For example, some designs are inappropriate for secure and dust-free transport of merchandise or for attractive display of large volumes of merchandise. Some designs are complicated to set up and take down. Some designs are poorly equipped or poorly designed for salesman-customer interaction and consultation. Many of the designs allow display of merchandise and interaction with customers on only one side of the stand. Many of the designs allow for only one business to be conducted in the stand at a time.

One type of mobile stand is the food concession stand commonly used at county fairs. Typically, these concession stands are cubicals on wheels with a window reaching down to about waist-level of the people inside the stand. One or more people usually serve food through the window or over a counter.

Another type of mobile stand is the portable stage for theater and concert productions. The stage in Berranger et al. (U.S. Pat. No. 4,720,945) is made of a central body, a rear body, and a front body, which slide apart to deepen into a theater stage. The front body has a rigid canopy, a sliding low floor, and two side floors that pivot out from between the chassis and the low floor to support the low floor. To set up the Barranger stage, numerous walls and floor extensions and the canopy must be slid and/or pivoted into position. The stage in Wenger, (U.S. Pat. No. 3,181,203) has multiple floor sections that are supported and connected by jacks and bracket elements. Setting up the Wenger stage requires numerous steps to slide, position, and bracket the floor sections and to pivot the canopy.

What is still needed for use in the gardening retail industry and in other industries is a mobile display and sales stand that is simple, efficient, and quick to set up for business and to fold up and secure for travel. The mobile display stand needs to provide a large surface area for attractive and easily-reachable display of merchandise. Also, what is needed is a mobile display stand that is self-contained with utilities and office equipment for use in locations that do not offer utility hookups or office facilities. What is needed is a mobile display stand that allows walk-around shopping with display and customer-salesman interaction on a plurality of sides of the stand. A mobile stand is needed that allows more than one company or vendor to conveniently and attractively conduct separate businesses in a single mobile display stand.

DISCLOSURE OF INVENTION

The present invention is a multiple-unit mobile display pavilion for transporting and displaying of sales merchandise or other objects. The pavilion comprises a trailer that is made mobile by attachment to a wheeled chassis and to a tractor or other vehicle. The trailer has an enclosure wall around an interior space that receives the merchandise during transport and also during display. The enclosure wall includes a floor, a roof, a front wall, a rear wall, and opposing first and second side walls. The side walls are preferably, but not necessarily, built of stud wall construction.

The multiple-unit mobile display pavilion has a two-sided display arrangement, in that the trailer has a first opening in the first side wall and a second opening in the second side wall of the trailer. The first opening and second opening are offset from each other, with the door and doorway of the first opening being located toward the rear of the trailer and the second-side doorway and second-side door of the second opening being located toward the front of the trailer. Solid portions of the sides walls are also offset from each other, with a solid portion of the first side wall being located toward the front of the trailer and a second-side solid portion of the second side wall being located toward the rear of the trailer. The multiple-unit mobile display pavilion further comprises support means on the door and on the second-side door for receiving merchandise for display, and latch means for securing the door and the second-side door.

The doorway in the first side wall of the trailer extends generally from near the floor to near the roof and is near the rear wall of the trailer. The door is attached by a hinge to the trailer near the bottom end of the doorway so that the door may swing up to cover the doorway and be secured by the latch means and may swing down to open the trailer for display and business. When open, the door lies at an acute angle to the ground, with its top edge resting on the ground. Therefore, the door inner surface faces generally upwards and outward when the door is open. A support means is located on the inner surface for receiving merchandise.

The second-side doorway in the second side wall of the trailer extends generally from near the floor to near the roof and is near the front wall. The second-side doorway and the second-side door operate and cooperate in similar fashion as do the doorway and door in the first side wall.

The doorway and door and second-side doorway and second-side door form the first opening and the second opening, respectively, into the trailer interior space. The offset positions of the first and second openings allow access to the rear and to the front areas of the interior space, respectively. Also, the offset positions both of the openings and of the solid portions of the side walls and having a significant part of the sidewalls being solid portions maintain a strong trailer enclosure wall without requiring I-beam reinforcement underneath the trailer floor.

A separation wall or other barrier may be placed in the trailer interior space extending from the solid portion of the first side wall to the second-side solid portion of the second side wall to separate the front area from the rear area of the interior space. Thus, the first opening may lead to a first business in the rear area, the second opening may lead to a separate second business in the front area, and the separation wall may separate or partially separate the two businesses.

Preferably, the support means on both the door and the second-side door comprises steps attached to the inner surface. A top surface of each step extends at an acute angle from the door or the second-side door, and the acute angle is generally similar to the acute angle between the open door or second-side door and the ground. In this way, when the door or second-side door is in the open position, each step top surface extends generally horizontal to the ground so that merchandise may be set on the steps but not necessarily tied or held down. The steps on the door and the second-side door form large areas for display, creating terraced platforms extending out from the trailer on the first side and the second side of the trailer.

Preferably, awnings may be included for extending out from the first side and from the second side of the trailer or for retracting against the trailer without blocking the first and second openings. The roof of the trailer may be a flexible tarp that may be extended over the trailer or may be rolled to one side to open the roof of the trailer. Preferably, the pavilion may be self-contained in terms of utilities, water, and office equipment.

Although the preferred embodiment of the multiple-unit pavilion is the two-unit design described above, the invention also includes embodiments having three, four or more units. Each unit comprises an opening on a side wall and a solid portion on the opposite side wall. The units are lined up adjacent to each other, positioned so that the openings, and therefore also the solid portions, alternate between the first side wall and the second side wall. Separation walls may be positioned between each unit, extending from the solid portion of one unit through the interior space to the solid portion of the next unit, in order to divide the trailer interior space into separate business areas.

The invented multiple-unit pavilion is an extremely effective apparatus for creating a mobile business. The pavilion may house one or more businesses and features walk-around shopping, which creates an attractive and efficient retail or display setting. The pavilion is quick and easy to set up for business, requiring only the parking of the trailer and the unlatching and lowering of doors. The pavilion may be set up, operated, and folded away by as few as one or two people. The preferred rectangular shape and two-sided, offset arrangement of the preferred two-unit multiple-unit pavilion maximizes the total inside and outside display area while allowing two separated businesses to operate in a single trailer with each business having at its disposal part of the trailer interior space and all of an entire side of the outside display area. The two-sided, offset arrangement also allows the trailer to be surprisingly architecturally strong. The pavilion may be a self-contained business or businesses, but, as a vehicle without a permanent location, it offers distinct business advantages in terms of investment, taxes, maintenance, and operating expenses. The pavilion transports merchandise in a closed, dust-free, and wind-free environment and displays them in an attractive and prominent setting. The alternative embodiments of the multiple-unit mobile display pavilion having three or more units have the same advantages as the two-unit design, except that the outside display area on a given side of the trailer may be divided between more than one business.

BEST MODE FOR CARRYING OUT INVENTION

Figure 1:
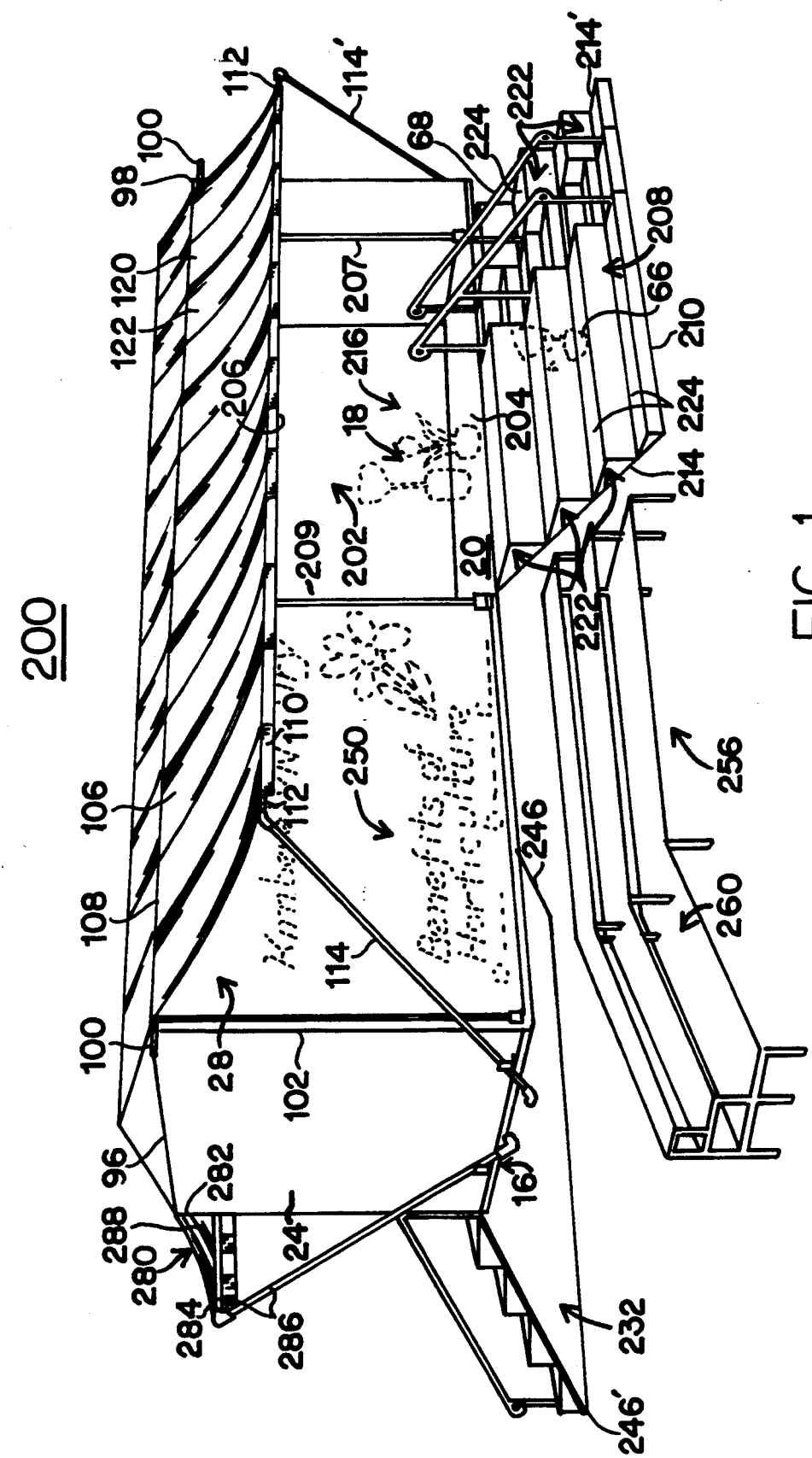
FIG. 1 is a right side perspective view of one embodiment of the invention.

Referring to FIGS. 1–7, there is shown the preferred but not the only embodiment of the multiple-unit mobile display pavilion 200. The pavilion 200 is attached to a wheeled chassis 12 and is pulled by a tractor 14 but may be parked and disconnected from the tractor 14. The preferred pavilion 200 is sized to be appropriate for highway travel and to be compatible with a tractor used in typical tractor-trailer combinations.

The trailer 16 has an interior space 18 surrounded and defined by an enclosure wall that includes a floor 20, roof 22, front wall 24, rear wall 26, and opposing first side wall 28 and second side wall 30. The first side wall 28 has a doorway 202, which extends substantially along the entire height of the first side wall 28, with the bottom end 204 of the doorway 202 being near the floor 20, the top end 206 being near the roof 22, the rear edge 207 being near the rear wall 26, and the front edge 209 extending midway between the rear wall 26 and the front wall 24. Door 208 has top edge 210, bottom edge 212, and a opposing first and second side edges 214 , 214' and is hinged at its bottom edge 212 to the trailer 16 near the doorway bottom end 204. The door 208 may be swung up to a closed position to cover doorway 202 or swung down to an open position to reach the ground. Electric winch 50 is included near the top end 206 of the doorway 202 and detachably connected by cable 52 to the door 208 for lowering and raising it. Alternatively, the door 208 could be swung by hand, ropes, or other means. When closed, the door 208 is secured by a latch means 54, which is preferably lockable from the outside or reachable only from the interior space 18 of the trailer 16 after access through a lockable, traditional door in the rear wall 26. The doorway 202 and door 208 cooperate to form the first opening, which leads into the rear area 216 of the trailer interior space 18.

When open, the door 208 rests on its top edge 210 on the ground, with the door inner surface 218 facing generally upward and the outer surface 220 facing generally downward toward the ground. The door top edge 210 serves as a strong, long, continuous support for the door 208 and the heavy merchandise 66. Thus, the door 208 is slanted between the floor 20 of the trailer 16 and the ground at an acute angle to the ground. In the preferred embodiment, the acute angle is approximately 30°, but this angle may vary depending on the length of the door 208 and the distance between the hinged bottom edge 212 of the door 208 and the ground.

Attached to the door 208 at the door inner surface 218 is a plurality of steps 222, which extend substantially all the way from the door bottom edge 212 to the door top edge 210 to transform the door inner surface 218 into a terraced platform. The top surface 224 of each step 222 extends from the door 208 at an acute angle to the door 208 that is generally similar to the acute angle of the door 208 to the ground, which was noted earlier as about 30°. This configuration places the step top surfaces 224 generally horizontal when the door 208 is open so that merchandise 66 may set on the steps 222 without being tied or latched. Thus, the steps 222 are a support means for holding merchandise 66 on the doors 208.

The steps 222 and door 208 are made of steel and sturdy aluminum material and include bracing and reinforcement necessary to support thousands of pounds of merchandise 66. The steps 222 are approximately 14 inch steps, in the preferred embodiment, and so they take up little space inside the trailer 16 when closed. Alternative support means may be used, but the preferred designs are ones that are strong enough to receive merchandise 66 along substantially the entire inner surface 218 of the door 208 and without time-consuming or complicated positioning or attachment. For example, steps with a lip or indented holders could be used to keep merchandise 66 in place. A series of upending lips could be used instead of steps 222 for merchandise 66 that does not particularly need to be horizontal.

Optionally, the door 208 or a part of the door may have steps and a detachable handrail 68 that are sized to be a comfortable stairway for people wishing to enter the trailer interior space 18. Optionally, another entryway may be designed in the trailer enclosure wall, such as a traditional door in the rear wall.

The second opening, which leads into the front area 226 of the trailer interior space 18, comprises a second-side doorway 230 in the second side wall 30 and second-side door 232. The second-side door 232 operates and cooperates with the second-side doorway 230 in a way similar to the operation and cooperation of the doorway 202 and door 208. The second-side doorway 230 has a top end 234, a bottom end 236, a front edge 238, and an opposing rear edge 240. The second-side door 232 has a top edge 242, a bottom edge 244, and two opposing side edges 246 and 246'. The second-side doorway 230 is positioned near the front of the trailer, with the front edge 238 near the front wall 24 and the rear edge 240 extending midway between the rear wall 26 and the front wall 24.

Figure 2:
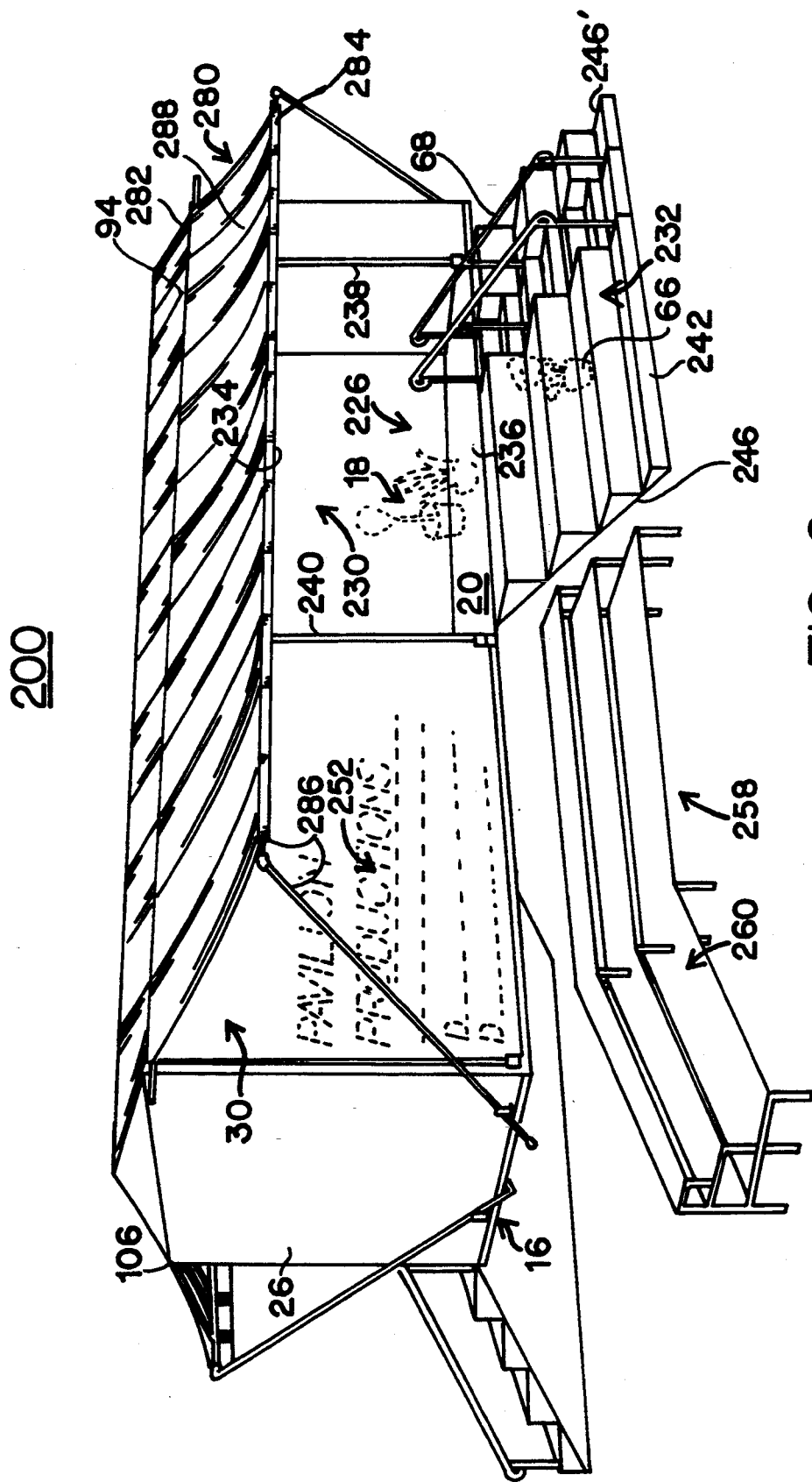
FIG. 2 is a left side perspective view of the embodiment of FIG. 1.
Figure 3:
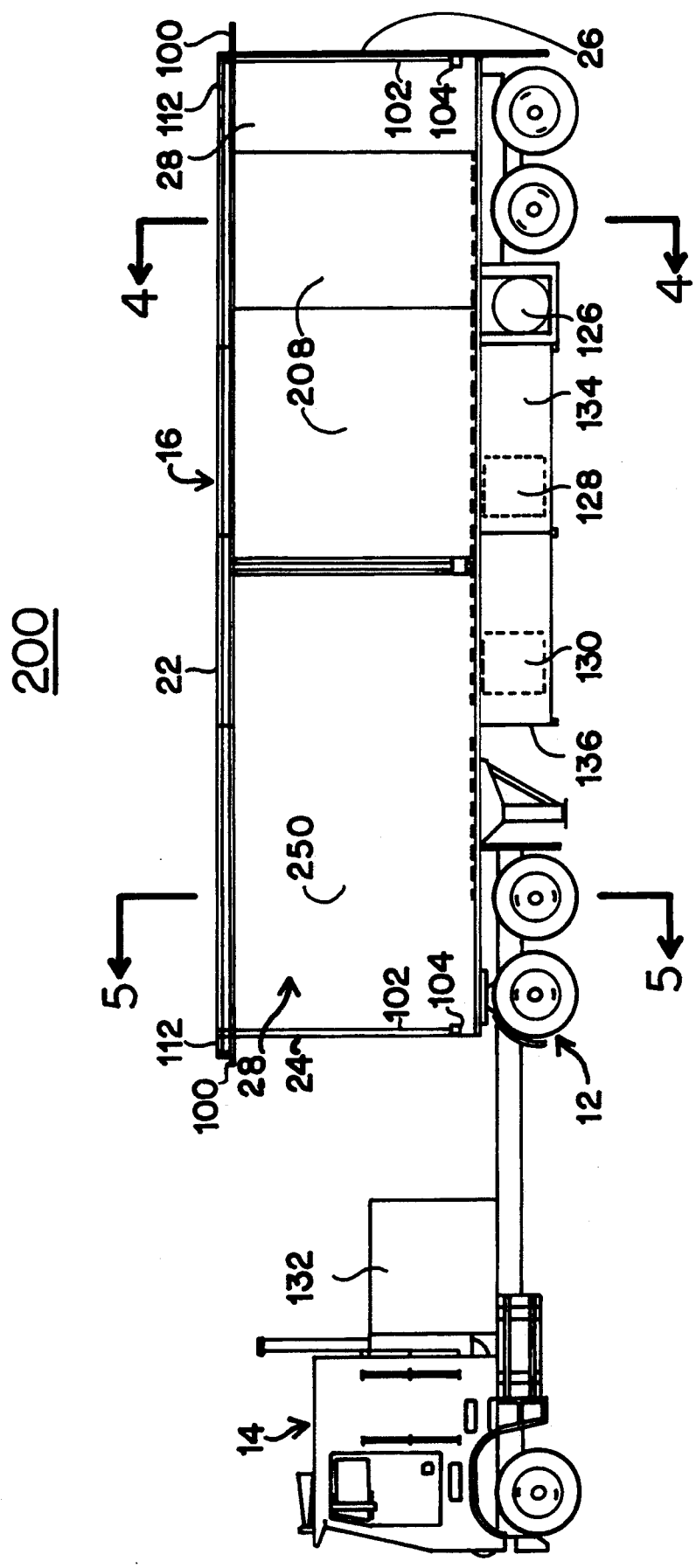
FIG. 3 is a right side view of the embodiment of FIG. 1, with doors closed and awning retracted, and attached to a tractor.
Figure 4A:
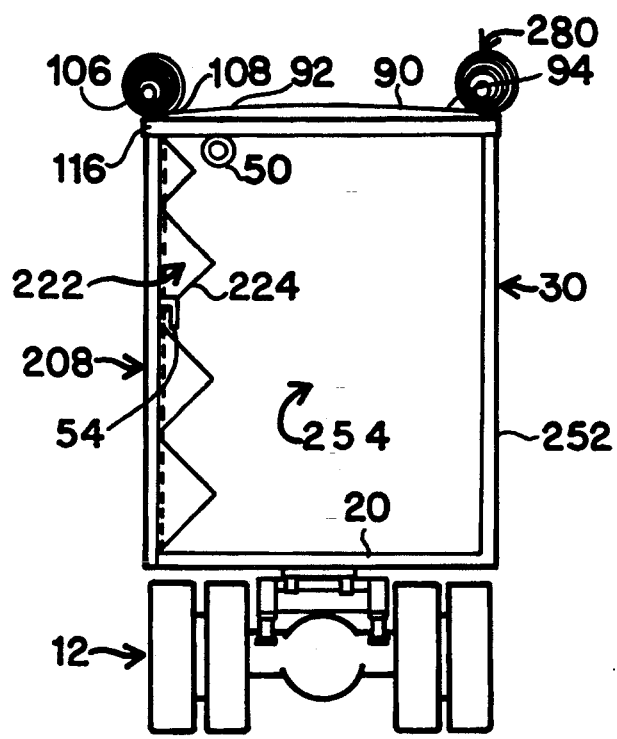
FIG. 4A is a rear cross-sectional view of the embodiment of FIG. 1, as viewed along the lines 4—4 in FIG. 3 and with the door closed and latched and awning retracted.
Figure 4B:
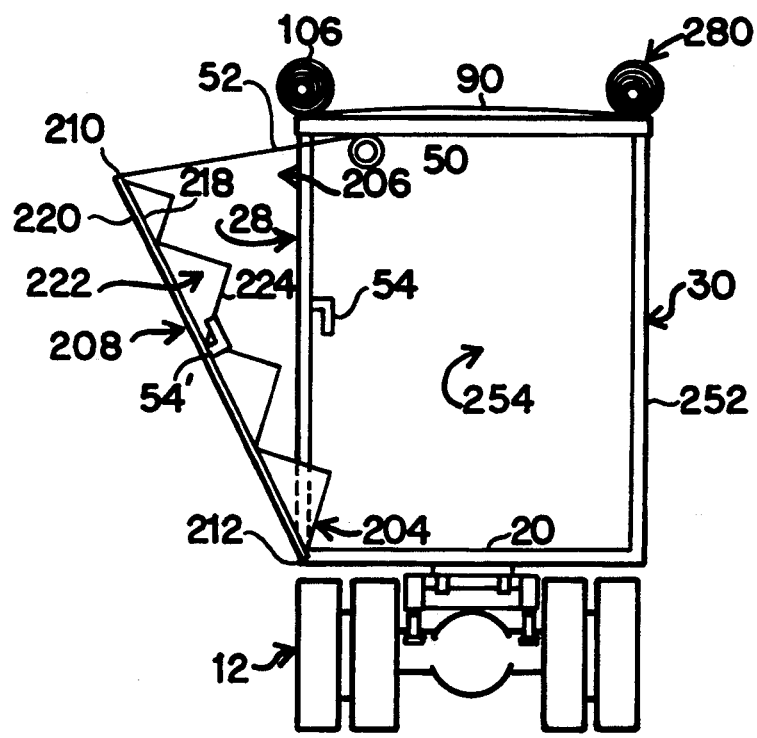
FIG. 4B shows the embodiment and view of FIG. 4A, except with the door partially open.
Figure 5:
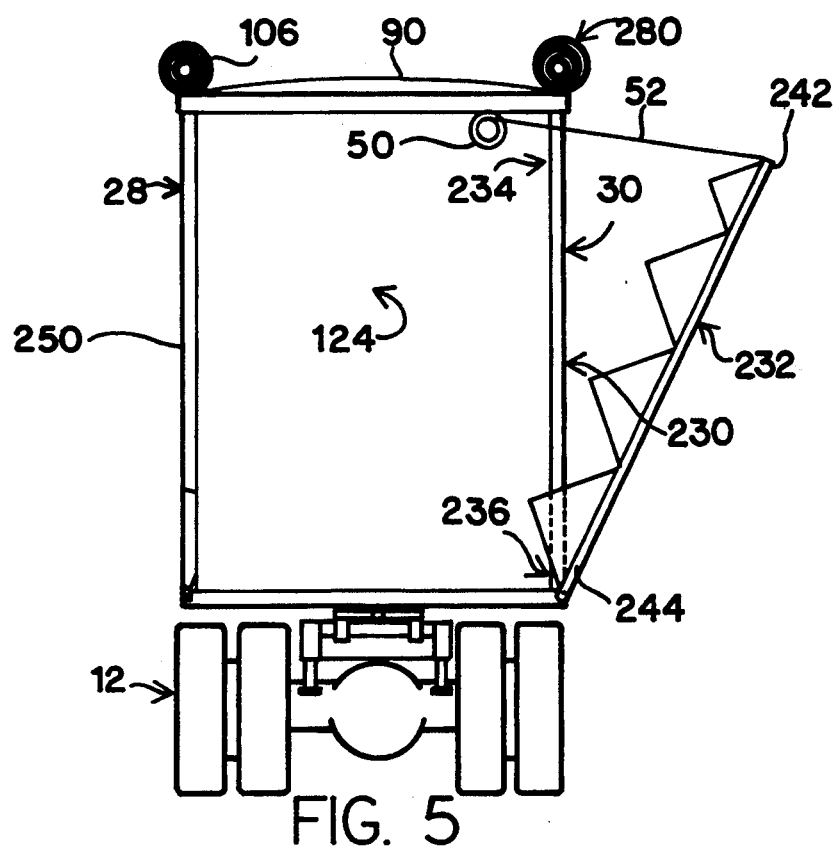
FIG. 5 is a rear cross-sectional view of the embodiment of FIG. 1 as viewed along the lines 5—5 in FIG. 3.
Figure 6:
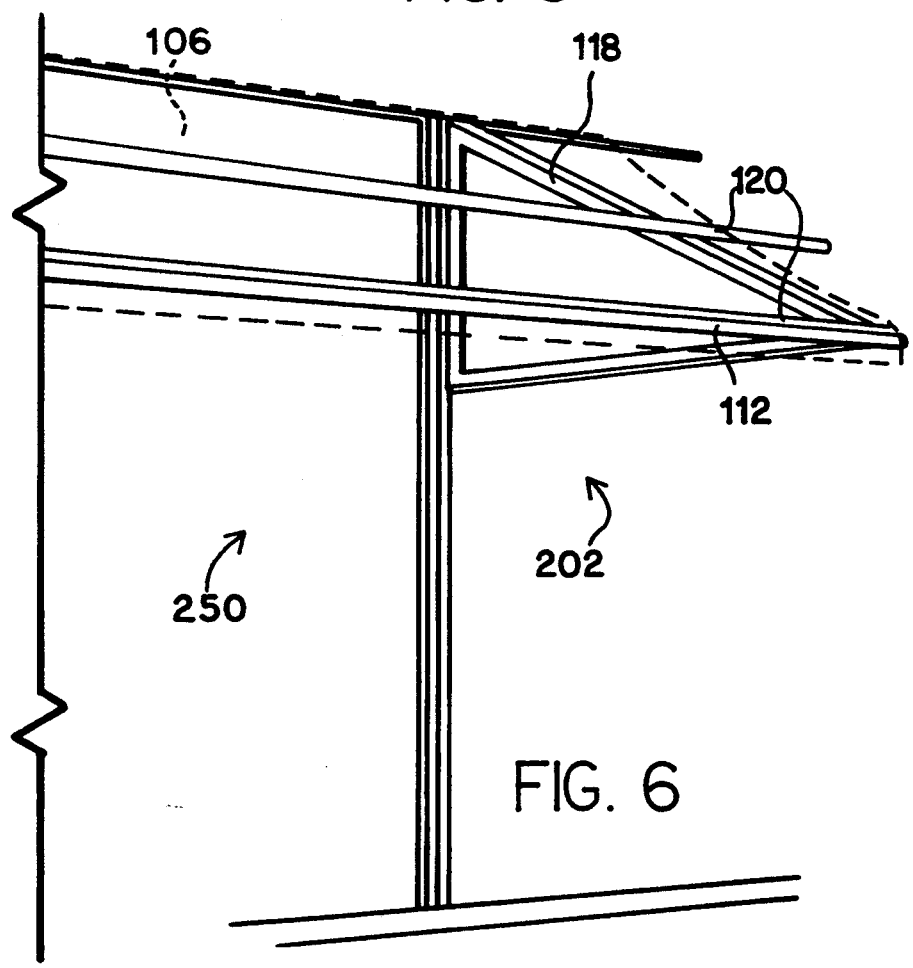
FIG. 6 is a detail of part of the frame underneath the extended awning tarp, which is shown in dashed lines.

As indicated by FIGS. 1 and 2, the door 208 and second-side door 232 are preferably mirror-images of each other in design and operation, except that they are offset with one being close to the front of the trailer and the other being close to the rear of the trailer. The solid portion 250 of the first side wall 28 and the second-side solid portion 252 of the second side wall 30 are also offset. The first and second openings need not be identical in size or appearance, but may be varied to accommodate the artistic or operational issues of the businesses using the pavilion 200.

The offset arrangement both of the first and second openings and of the solid portion 250 and second-side solid portion 252 allows the first side wall 28 to be opened up to the rear area 216 and the second side wall 30 to be opened up to the front area 226, and allows the rear area 216 and front area 226 to be separated by an optional separation wall 254 extending from the solid portion 250 of the first side wall to the second-side solid portion 252. This offset arrangement allows for two separate businesses or displays to conveniently operate in the pavilion 200. One business may operate in the first unit, which is the L-shaped space formed by the rear area 216, the terraced platform of the door 208, and the outside area 256 adjacent to the first side wall solid portion 250. The other business may operate in the second unit, which is the L-shaped space formed by the front area 226, the terraced platform of the second-side door 232, and the outside area 258 adjacent to the second-side solid portion 252. Optionally, collapsible shelving 260, tents, greenhouses, or other display apparatus may be placed in the outside areas 256,258 to supplement the display capability of the pavilion 200.

The preferred design of the multiple-unit mobile display pavilion 200 has several surprising benefits. Designing the trailer so that the solid portion 250 and second-side solid portion 252 amount to about half of the length of the first side wall 28 and the second side wall 30, respectively, and offsetting these solid portions to the front and the rear, respectively, results in a surprisingly open, airy, efficient, and attractive display space and yet also a surprisingly strong trailer structure. Thus, the multiple-unit pavilion 200 houses two businesses that need not mingle their goods or even be visible to each other unless they wish to open up the separation wall 254. Each business has a significant area of interior space inside the trailer and a large, versatile display area outside the trailer that face oppositely from the other business located in the opposite side of the pavilion. This arrangement is especially effective in festivals, fairs, or shows where several multiple-unit pavilions 200 could be parked in a field or lot to make a festive, attractive, and space-efficient shopping or viewing area. While providing attractiveness and efficiency, the design also makes the trailer 16 extremely strong, even though about half of each side wall may be opened. With the offset opening design, the trailer need not include the heavy and expensive steel I-beams that are normally required for a truck bed, such as a flat-bed, that has open sides. This lack of I-beams allows the undercarriage 136 beneath the trailer floor 20 to be used for the fuel tank 126, generator 128, furnace 130, and storage.

The use of the terms "first side" and "second side" are intended only to help in the clear description of the invention but are not intended to limit the door 208 or the second-side door 232 or the first opening or second opening to being on either the left or right side of the trailer.

The term "midway" in relation to the doorway 202 and second-side doorway 230 means generally in a middle region of the first side wall 28 or second side wall 30, which may be from about ⅓ of the way from the rear wall 26 to the front wall 24 to about ⅔ of the way from the rear wall 26 to the front wall 24. Preferably, for a two-unit design, the doorway front edge 209 extends about half way between the rear wall 26 and front wall 24 and the second-side doorway rear edge 240 extends about half way between the front wall 24 and the rear wall 26, which allows the first opening and second opening to open up the first side wall 28 and second side wall 30, respectively, to make the rear area 216 and the front area 226 roughly equal halves of the interior space 18. However, other distances in that middle region besides half-way may be used, depending on what relative sizes of rear area 216 and front area 226 are desired. For example, a large business and a small business might fit well into a multiple-unit pavilion 200 in which the rear area 216 and the front area 226 were ⅔ and ⅓ of the interior space 18, respectively.

The optional separation wall 254 may be of various designs, including a solid wall, a wall with a door, or a wall that may be retracted. Examples of a retractable wall would include a folding wall, a sliding wall, or a removable and replaceable wall. Building the separation wall 254 with a door or with the removable and replaceable feature allows communication or foot traffic between the first and second units or allows a single business to use the entire multiple-unit pavilion 200.

Figure 7:
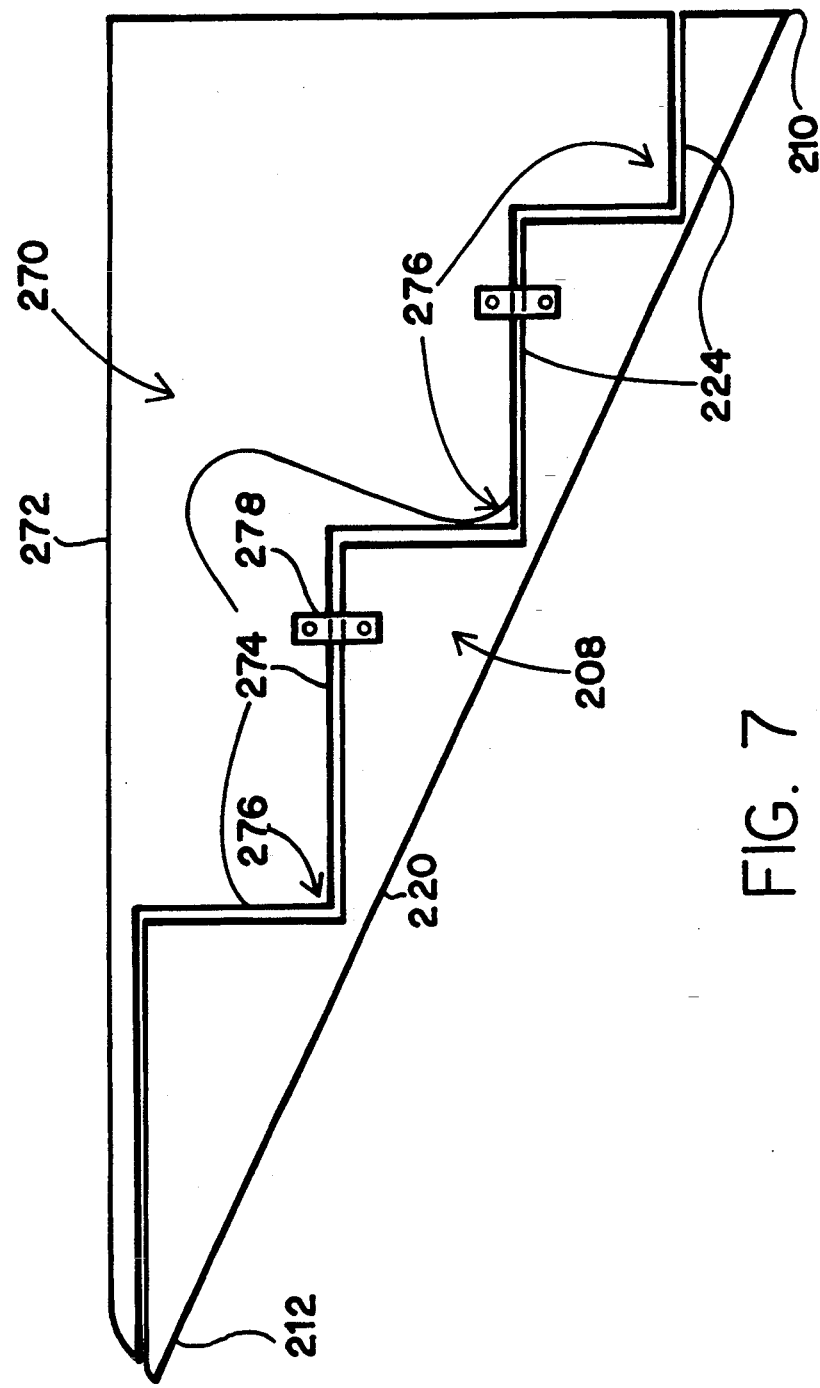
FIG. 7 is a detail of an open door with an attached stage member.

Optionally, a stage member 270 may be included in the multiple-unit pavilion 200 to adapt one or more of the terraced platforms into a generally flat and horizontal outside stage area, as shown in FIG. 7. The preferred stage member 270 has a generally horizontal top surface 272 and a terraced bottom surface 274 that cooperates with and lies on the steps 222 of the door 208 or second-side door 232. By "terraced" is meant that the stage member 270 is generally triangular in cross-section, with the bottom surface 274 having a plurality of steps 276, as shown in FIG. 7. The terraced bottom surface 274 and an attachment means 278 that secures the stage member 270 to the door 208 provide a safe, secure, and simple way to quickly install a removable outside stage area that extends out from the trailer 16. The attachment means 278 may be bolts, brackets, or other detachable fastening devices. Optionally, the attachment means 278 may be designed to hold the stage member 270 on the steps 222 even when the door 208 is closed, in which case the stage member 270 would then swing up into the interior space 18 of the trailer 16. Optionally, the stage member 270 could be detached, inverted to sit on its top surface 272, and used as display shelving either inside or outside the trailer 16.

In the preferred embodiment, the roof 22 is a flexible roof tarp 90 that has a first edge 92, an opposing second edge 94, a front edge 96 and a rear edge 98 for extending to reach the first side wall 28, second side wall 30, front wall 24, and rear wall 26, respectively. The second edge 94 is connected to the second side wall 30 and the other three edges of the roof tarp 90 are unattached so that the roof tarp 90 may be rolled or pulled toward the second edge to 94 uncover the trailer 16. A biasing bar 100 runs across and is connected to the roof tarp 90 near its first edge 92, and straps 102 are connected to the biasing bar 100 and run down the trailer first side wall 28 to hand-winches 104 that are attached to the first side wall 28. These hand-winches 104 are manually operated to pull and lock the straps 102, which in turn pull the biasing bar 100 to keep the roof tarp 90 taut across the trailer 16. Thus, the biasing bar 100, straps 102, and hand-winches 104 act as a biasing means for releasably keeping the roof tarp 90 first edge 92 in an extended position across the trailer 16. Additional beams under the extended roof tarp 90 act as structural members for the trailer 16 and as support members for the roof tarp 90.

The preferred embodiment also has an optional awning for extension out from the trailer 16 over the terraced platform 62 or for retraction close to the trailer 16. The preferred awning has a flexible awning tarp 106 that has a first edge 108 connected to the first edge 92 of the roof tarp 90, and an opposing second edge 110 connected to an extension bar 112. The extension bar 112 is connected to handles 114 and 114' that may be removably fastened to the front wall 24 and the rear wall 26 to securely hold the awning tarp 106 in the extended position. The handles 114 and 114' may be unfastened from the front wall 24 and rear wall 26 and operated to roll up the awning tarp 106 around the extension bar 112 for retraction to a position near the corner 116 joining the roof 20 and the first side wall 28. When retracted, the awning does not block or interfere with the door 208 or doorway 202. A frame made of triangular support wings 118 and crossbars 120 is removably installed on the first side wall 28 of the trailer to support the awning tarp when it is extended. Thus, the extension bar 112, handles 114 and 114', and frame act as a releasable extension means for extending the awning tarp 106.

The preferred multiple-unit pavilion 200 also includes a retractable second-side awning 280 having a first edge 282 connected to the trailer 16 near the second side wall 30 near the roof 22 and a second edge 284 for extending out from the trailer 16 over the second-side door 232 and the outside area 258. The second-side awning 280 has a retractable extension means 286 that may be similar to the extension means of the awning 106 at the first side wall 28. As with the awning at the first side wall, the second-side awning 280 and extension means 285 are preferably designed so that the awning 280 may be retracted and held close to the trailer 16 without blocking or interfering with the second-side door 232 or second-side doorway 230. The preferable second-side awning 280 includes an awning tarp that may be connected to the roof tarp 90 and that may be rolled into a retracted position.

In the preferred embodiment, the roof tarp 90 and awning tarp 106 are made from the same continuous piece of material, which is a canvas having alternating translucent sections 120 and opaque sections 122. These sections give a reduced sunlight or partial sun/partial shade effect that has been found advantageous for sustaining healthy plants and trees. The preferred canvas has about a 55/45 ratio of translucent/opaque sections 120 and 122, which has been found to be particularly beneficial to a variety of plants, but other ratios could be used. The partially translucent roof tarp 90 allows a mobile garden center to transport live plants inside the trailer 16 without degenerating their health. The retractable roof tarp 90 feature allows the roof 22 to be opened up during a stop along the road to adjust the temperature or humidity in the trailer interior space 18 or during normal business operation to let in more sunlight. The roof 22 and awning design make the pavilion 200 suitable for rainy-day use, as they do not trap water or let water through to the merchandise 66.

The preferred trailer enclosure wall includes stud wall construction, which places the structural support studs on the inside of smooth outer surfaces. Paneling, signs, cabinets, or other display surfaces may be installed on the inside of the studs, and wiring, ducting, or other materials may extend through the stud walls to be hidden in an attractive manner. Steel and aluminum construction makes the trailer and doors lightweight and durable. The pavilion 200 may be custom made or may be a retrofit into an existing tractor-trailer combination.

An office partition wall and door may be optionally included inside the trailer 16 at the front end 124, at the rear, or at both to provide a lockable office. The preferred office includes a fold-down writing and drafting table, a lockable cash drawer, a hot water-equipped sink, cellular phone and fax, and a music system for broadcasting music into and around the trailer.

The pavilion 200 is preferably self-contained for operation without requiring hookup to an electrical or water source, but also has optional hookups for use when outside electricity and water are available. A tank 126 for propane or other fuel, propane-powered electricity generator 128, a propane-powered furnace 130 and blower, electric lights, and heat ducts are included. A water pump, water heater, and water storage tank 132 are included. The water tank 132 is preferably attached to the tractor 14 so that it can be driven away for filling without moving the trailer 16. The propane tank 126, generator 128, furnace 130, blower, and additional storage space 134 are preferably located in a reinforced undercarriage 136 below the trailer floor 20. Optional refrigeration equipment may be included and powered by the generator 128, for storing fresh produce, for example.

Figure 8A:
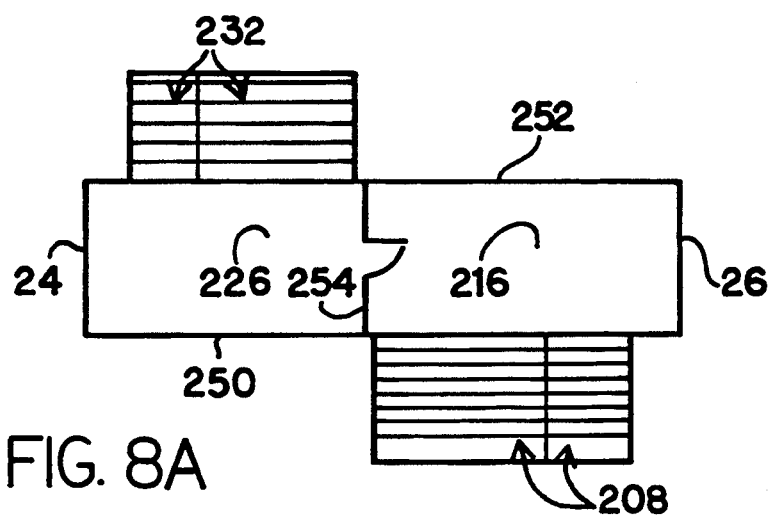
FIG. 8A is a top view floor plan of the two-unit embodiment of FIG. 1.
Figure 8B:
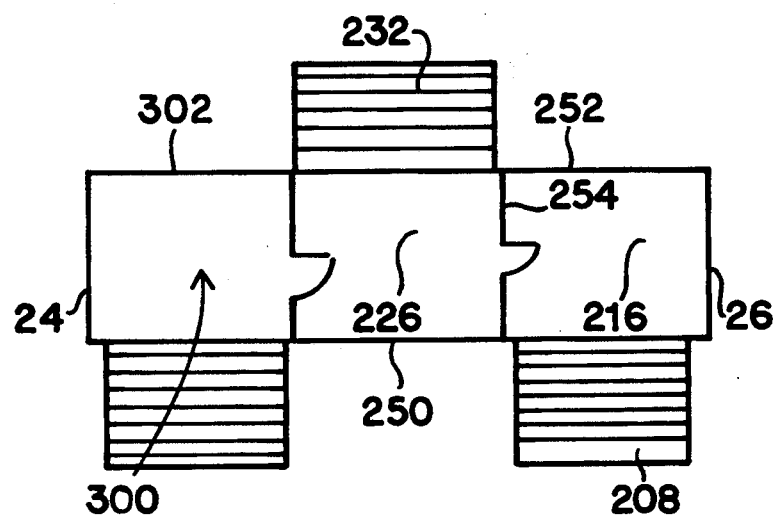
FIG. 8B is a top view floor plan of a three-unit embodiment of the invention.
Figure 8C:
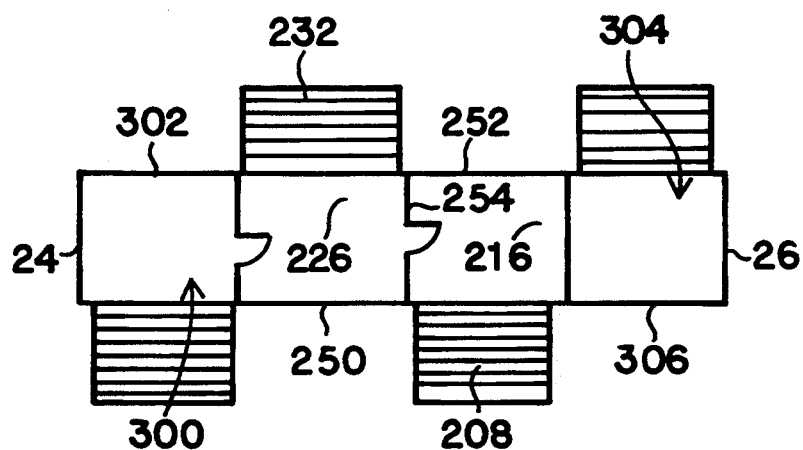
FIG. 8C is a top view floor plan of a four-unit embodiment of the invention.

Although the preferred embodiment of the multiple-unit pavilion is the two-unit design described above, the invention also includes embodiments having three, four, or more units. Each unit comprises an opening on a side wall and a solid portion on the opposite side wall. The units are lined up adjacent to each other, positioned so that the openings, and therefore also the solid portions, alternate between the first side wall and second side wall. For example, comparing a three unit design to a two unit design, as shown in FIG. 8, the third opening 300 is in the first side wall between the solid portion 250 and the front wall 24 and the third solid portion 302 is in the second side wall between the second-side doorway 230 and the front wall 24. Thus, the first side wall of the three unit embodiment has two openings separated by a solid portion and the second side wall has two solid portions separated by an opening. For example, in a four unit design, a fourth opening 304 is in the second side wall between the second side solid portion 252 and the rear wall 26 and the fourth solid portion 306 is in the first side wall between the doorway 202 and the rear wall 26. Separation walls may be positioned between each unit, extending from the solid portion of one unit through the interior space to the solid portion of the next unit, in order to divide the trailer interior space into separate business area.

In the above descriptions of embodiments of the multiple-unit pavilion and in the claims, the term "near" in the phrases such as "a rear edge near the rear wall", "the solid portion extending from near the front wall", "a front edge near the front wall", and "second-side solid portion extending from near the rear wall" is intended to mean "nearer" or "toward", but not necessarily so close as to exclude other elements from lying in between. For example, in a three-unit embodiment, the solid portion 250 and the second-side doorway front edge 238 are near the front wall 24, but other elements, namely, a third opening 300 and a third solid portion 302 lie between the front wall 24 and the solid portion 250 and the front edge 238, respectively.

In the above descriptions of embodiments of the multiple-unit pavilion and in the claims, the terms "door" and "second-side door" may each be interpreted to mean either a single door or a plurality of doors that are closely adjacent. In the case of a plurality of doors, each door has a latch means and a means for raising and lowering the door.

While there is shown and described the present preferred embodiment of the invention, it is to be distinctly understood that this invention is not limited thereto but may be variously embodied to practice within the scope of the following claims.

I claim:

1. A multiple-unit mobile pavilion attached to a wheeled chassis, said multiple-unit mobile pavilion transporting and displaying merchandise and comprising:

a trailer lying on and being attached to the wheeled chassis, the trailer having an enclosure wall surrounding and defining an interior space receiving the merchandise, the enclosure wall comprising a floor, a roof, a front wall, a rear wall, and opposing first and second side walls, the first side wall having a doorway and a solid portion, the doorway having a bottom end near the floor, a top end near the roof, a rear edge near the rear wall, and an opposing front edge extending mid-way between the front wall and the rear wall, and the solid portion extending from near the front wall to the front edge of the doorway, the second side wall having a second-side doorway and a second-side solid portion, the second-side doorway having a bottom end near the floor, a top end near the roof, a front edge near the front wall, and an opposing rear edge extending midway between the rear wall and the front wall, and the second-side solid portion extending from near the rear wall to near the rear edge of the second-side doorway, a door having an inner surface, an outer surface, a bottom edge, a top edge, and two opposing side edges, the door being hinged at its bottom edge to the trailer near the bottom end of the doorway so that the door may swing up to a closed position across the doorway with the inner surface facing the trailer interior space and swing down to an open position resting the door top edge on the ground to position the door at an acute angle relative to the ground, a support means attached to the inner surface of the door, said support means receiving the merchandise when the door is in the open position, and a latch means detachably securing the door in the closed position, a second-side door having an inner surface, an outer surface, a bottom edge, a top edge, and two opposing side edges, the second-side door being hinged at its bottom edge to the trailer near the bottom end of the second-side doorway so that the second-side door may swing up to a closed position across the second-side doorway with the inner surface facing the trailer interior space and swing down to an open position resting the second-side door top edge on the ground to position the second-side door at an acute angle relative to the ground, a support means attached to the inner surface of the second-side door, said support means receiving the merchandise when the second-side door is in the open position, and a latch means detachably securing the second-side door in the closed position.

2. A multiple-unit mobile pavilion as set forth in claim 1, further comprising a separation wall extending from the solid portion of the first side wall, through the interior space of the trailer, and to the second-side solid portion of the second side wall, said separation wall dividing the interior space of the trailer.

3. A multiple-unit mobile pavilion as set forth in claim 2, wherein the separation wall is retractable for opening up the interior space of the trailer.

4. A multiple-unit mobile pavilion as set forth in claim 1, wherein the support means attached to the inner surface of the door comprises a plurality of steps, each step having a top surface that is generally horizontal when the door is in the open position, said top surface receiving the merchandise.

5. A multiple-unit mobile pavilion as set forth in claim 1, wherein the support means attached to the inner surface of the second-side door comprises a plurality of steps, each step having a top surface that is generally horizontal when the second-side door is in the open position said top surface receiving the merchandise.

6. A multiple-unit mobile pavilion as set forth in claim 4, further comprising:

a stage member having a generally horizontal top surface and a bottom surface that is terraced to lie on and cooperate with the plurality of steps attached to the inner surface of the door, and an attachment means removably securing the stage member to the door.

7. A multiple-unit mobile pavilion as set forth in claim 5, further comprising:

a second-side stage member having a generally horizontal top surface and a bottom surface that is terraced to lie on and cooperate with the plurality of steps attached to the inner surface of the second-side door, and an attachment means for removably securing the second-side stage member to the second-side door.

8. A multiple-unit mobile pavilion as set forth in claim 1, further comprising a retractable awning having opposing first and second edges and an extension means, the first edge being connected to the trailer near the first side wall and near the roof, and the extension means releasably extending and holding the second edge out away from the trailer and retracting and holding the second edge close to the trailer without blocking the doorway.

9. A multiple-unit mobile pavilion as set forth in claim 1, wherein the roof comprises a retractable flexible roof tarp and a biasing means, the roof tarp having opposing first and second edges and the second edge being attached to the second side wall of the trailer, and the biasing means releasably biasing the first edge to extend toward the first side wall to cover the trailer.

10. A multiple-unit mobile pavilion as set forth in claim 1, further comprising a retractable second-side awning having opposing first and second edges and an extension means, the first edge being connected to the trailer near the second side wall and near the roof, and the extension means releasably extending and holding the second edge out away from the trailer and retracting and holding the second edge close to the trailer without blocking the second-side doorway.

11. A multiple-unit mobile pavilion as set forth in claim 8, wherein the awning comprises both translucent sections and opaque sections controlling the amount of sunlight penetrating through the awning.

12. A multiple-unit mobile pavilion as set forth in claim 9, wherein the roof tarp comprises both translucent sections and opaque sections controlling the amount of sunlight penetrating through the roof into the interior space of the trailer.

13. A multiple-unit mobile pavilion as set forth in claim 10, wherein the second-side awning comprises both translucent sections and opaque sections controlling the amount of sunlight penetrating through the second-side awning.

14. A multiple-unit mobile pavilion as set forth in claim 1, wherein the trailer enclosure wall is of stud wall type construction.

15. A multiple-unit mobile pavilion as set forth in claim 1, further comprising a fuel tank and a fuel-powered electricity generator supplying the pavilion with electricity.

16. A multiple-unit mobile pavilion as set forth in claim 15, further comprising a fuel-powered furnace heating the pavilion.

* * * * *